United States Patent
Singer et al.

(10) Patent No.: US 11,936,236 B2
(45) Date of Patent: Mar. 19, 2024

(54) SELECTIVE DISCHARGING OF RECHARGEABLE BATTERY PACK ACROSS SYSTEM LOAD

(71) Applicant: INTERNATIONAL BUSINESS MACHINES CORPORATION, Armonk, NY (US)

(72) Inventors: Noah Singer, White Plains, NY (US); Steven John Ahladas, Highland, NY (US); Robert K. Mullady, Highland, NY (US); Brian Charles Tucker, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

(21) Appl. No.: 17/205,110

(22) Filed: Mar. 18, 2021

(65) Prior Publication Data
US 2022/0302745 A1 Sep. 22, 2022

(51) Int. Cl.
*H02J 9/06* (2006.01)
*H02J 7/00* (2006.01)

(52) U.S. Cl.
CPC ............. *H02J 9/061* (2013.01); *H02J 7/005* (2020.01); *H02J 7/0063* (2013.01); *H02J 7/0069* (2020.01)

(58) Field of Classification Search
CPC .......... H02J 9/061; H02J 7/005; H02J 7/0063; H02J 7/0069; H02J 7/0047; H02J 9/06
See application file for complete search history.

(56) References Cited

U.S. PATENT DOCUMENTS

| 3,609,386 A | * | 9/1971 | Patlach | H02J 9/061 |
| | | | | 307/66 |
| 4,761,563 A | * | 8/1988 | Ross | H02J 9/066 |
| | | | | 307/64 |

(Continued)

FOREIGN PATENT DOCUMENTS

| CN | 109638904 A | 4/2019 |
| JP | H 11146575 A | 5/1999 |

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Stacy Whitmore
(74) *Attorney, Agent, or Firm* — Michael A. Petrocelli, Esq.; Kevin P. Radigan, Esq.; Heslin Rothenberg Farley & Mesiti P.C.

(57) ABSTRACT

Selective discharging of a rechargeable battery pack across a power supply system load is provided, which includes determining occurrence of a condition within the power supply system, the power supply system including a power supply circuit and a backup energy source. The power supply circuit receives main input power, and the backup energy source is operatively coupled to the power supply circuit to supply backup power to the system load when main power input to the power supply circuit is unavailable. Based on determining occurrence of the condition within the power supply system, a controller actively discharges a rechargeable battery pack of the backup energy source. The actively discharging includes controlling the power supply circuit to force discharging of power from the rechargeable battery pack to the power supply system load by suspending (Continued)

the main input power within the system from powering the system load.

20 Claims, 13 Drawing Sheets

(56) References Cited

U.S. PATENT DOCUMENTS

| | | | | |
|---|---|---|---|---|
| 6,274,950 | B1* | 8/2001 | Gottlieb | G01R 31/3648 |
| | | | | 307/66 |
| 6,697,955 | B1* | 2/2004 | Malik | H02M 1/4208 |
| | | | | 713/340 |
| 6,700,351 | B2 | 3/2004 | Blair et al. | |
| 6,850,039 | B2 | 2/2005 | Popescu | |
| 7,564,217 | B2 | 7/2009 | Tanigawa et al. | |
| 7,764,049 | B2 | 7/2010 | Iwane et al. | |
| 9,024,590 | B2 | 5/2015 | Namou et al. | |
| 9,490,663 | B1 | 11/2016 | Kim et al. | |
| 9,941,719 | B2* | 4/2018 | Seo | H02J 50/10 |
| 10,044,202 | B2* | 8/2018 | Coq | H02J 7/00302 |
| 10,587,140 | B1* | 3/2020 | Wang | G06F 1/30 |
| 10,658,856 | B1 | 5/2020 | Baruzzi et al. | |
| 11,462,917 | B1* | 10/2022 | LaBach | H01M 10/482 |
| 2002/0153777 | A1* | 10/2002 | Dishman | H02J 9/06 |
| | | | | 307/64 |
| 2004/0010649 | A1* | 1/2004 | Weaver | H02J 9/00 |
| | | | | 307/66 |
| 2006/0176020 | A1* | 8/2006 | Ibrahim | H02J 7/007182 |
| | | | | 320/127 |
| 2014/0132219 | A1 | 5/2014 | Namou et al. | |
| 2014/0203780 | A1 | 7/2014 | Hu et al. | |
| 2014/0331070 | A1* | 11/2014 | Du | H02J 9/061 |
| | | | | 713/340 |
| 2016/0172901 | A1* | 6/2016 | Hsieh | G01R 31/382 |
| | | | | 307/66 |
| 2017/0093207 | A1 | 3/2017 | Park et al. | |
| 2019/0214909 | A1* | 7/2019 | Singer | H02M 3/156 |
| 2020/0088796 | A1 | 3/2020 | Werner et al. | |
| 2020/0144841 | A1 | 5/2020 | Baruzzi et al. | |
| 2020/0251915 | A1 | 8/2020 | Singer et al. | |
| 2020/0266647 | A1* | 8/2020 | Ramachandran | H01M 10/48 |
| 2022/0043066 | A1* | 2/2022 | Lloyd | G01R 31/392 |

OTHER PUBLICATIONS

International Search Report & Written Opinion for PCT International Application No. PCT/CN2022/081200, dated Jun. 15, 2022 (9 pages) (Year: 2022).

* cited by examiner

SELECTIVE DISCHARGING OF RECHARGEABLE BATTERY PACK ACROSS SYSTEM LOAD

BACKGROUND

A wide variety of batteries are available for use as an energy source, including as a backup energy source. A typical battery is formed by a number of electrical cells connected in a series or parallel configuration to define a battery pack. Many types of battery packs include rechargeable cells, such that when an energy source is applied to the cells, energy is stored within the cells. There are a variety of different chemical combinations for the cathode and anode of the cells, including, for instance, nickel cadmium (NiCd), nickel metal hydride (NiMH), and lithium-ion (Li-Ion) compositions.

For example, lithium-ion batteries are rechargeable batteries in which lithium-ions move from a negative electrode to a positive electrode during discharge, and back when charging. An intercalated lithium compound is used in a lithium-ion battery as one electrode material. The electrolyte (which allows for ionic movement) and the two electrodes are the constituent components of a lithium-ion battery cell. A cell is a basic electrochemical unit that contains the electrodes, separator and electrolyte. As noted, a battery or battery pack is a collection of cells or cell assemblies. These may be readied for use as a battery pack by providing, for instance, an appropriate housing and electrical interconnections, which depend on the implementation.

SUMMARY

Certain shortcomings of the prior art are overcome and additional advantages are provided through the provision, in one or more aspects, of a method which includes determining occurrence of a condition within a power supply system, the power supply system including a power supply circuit and a backup energy source. The power supply circuit receives main input power, and the backup energy source is operatively coupled to the power supply circuit to supply backup power to a system load when main input power to the power supply circuit is unavailable. The method further includes, based on determining occurrence of the condition within the power supply system, actively discharging, by a controller, a rechargeable battery pack of the backup energy source. The actively discharging includes controlling the power supply circuit to force discharging of power from the rechargeable battery pack to the system load by suspending the main input power within the power supply system from powering the system load.

Systems and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
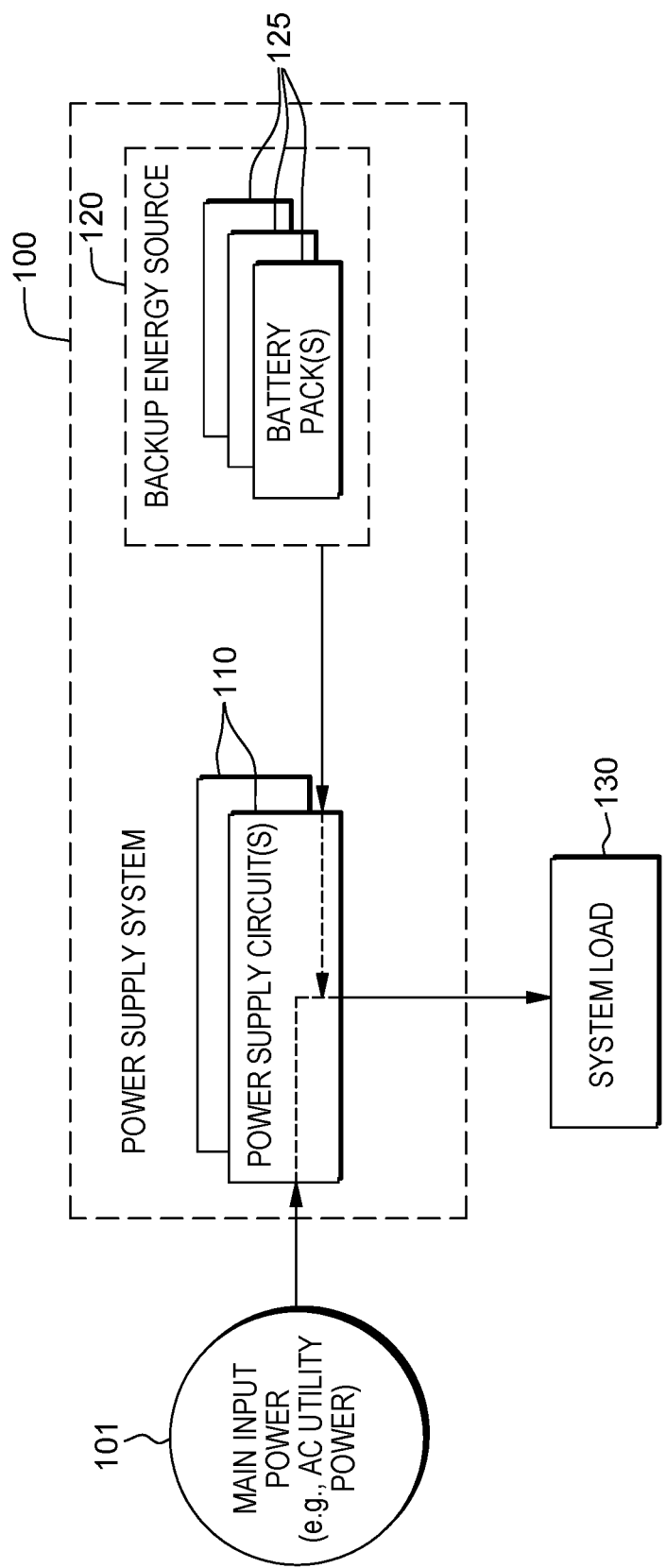
FIG. 1 depicts one embodiment of a power supply system to incorporate selective discharging of a rechargeable battery pack across a power supply system load, in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description, serve to explain aspects of the present invention. Note in this regard that descriptions of well-known systems, devices, processing techniques, etc., are omitted so as not to obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure.

Note further that numerous inventive aspects and features are disclosed herein, and unless inconsistent, each disclosed aspect or feature is combinable with any other disclosed aspect or feature as desired for a particular application of one or more of the concepts disclosed herein.

Note also that illustrative embodiments are described below using specific systems, circuits, designs, architectures, protocols, layouts, schematics, or tools only as examples, and not by way of limitation. Furthermore, the illustrative embodiments are described in certain instances using particular software, hardware, firmware, tools, or data processing environments only as example for clarity of description. The illustrative embodiments can be used in conjunction with other comparable or similarly purposed systems, applications, or architectures. One or more aspects of an illustrative embodiment can be implemented in hardware, software, or a combination thereof.

As understood by one skilled in the art, the controllers or control systems referenced in one or more embodiments described herein can include, for instance, a control interface and a microcontroller configured to perform at least the particular processing described. In one or more implementations, the control processing is integrated within the power supply system, such as integrated within the power supply circuit and/or the backup energy source (i.e., the battery backup circuit(s)). In one or more other implementations, certain control processing aspects can be implemented remotely from the power supply circuit and/or the backup energy source. For instance, in one or more embodiments, certain aspects of the control processing described herein can be implemented in a central location within an electronics rack or information technology (IT) rack containing the power supply system, or within a data center containing one or more electronics or IT racks with one or more power supply systems such as disclosed herein. In one or more further embodiments, certain control processing aspects disclosed herein could be implemented in a cloud-based environment, with the power supply system being operatively coupled to the remote control system across one or more networks.

Figure 8:
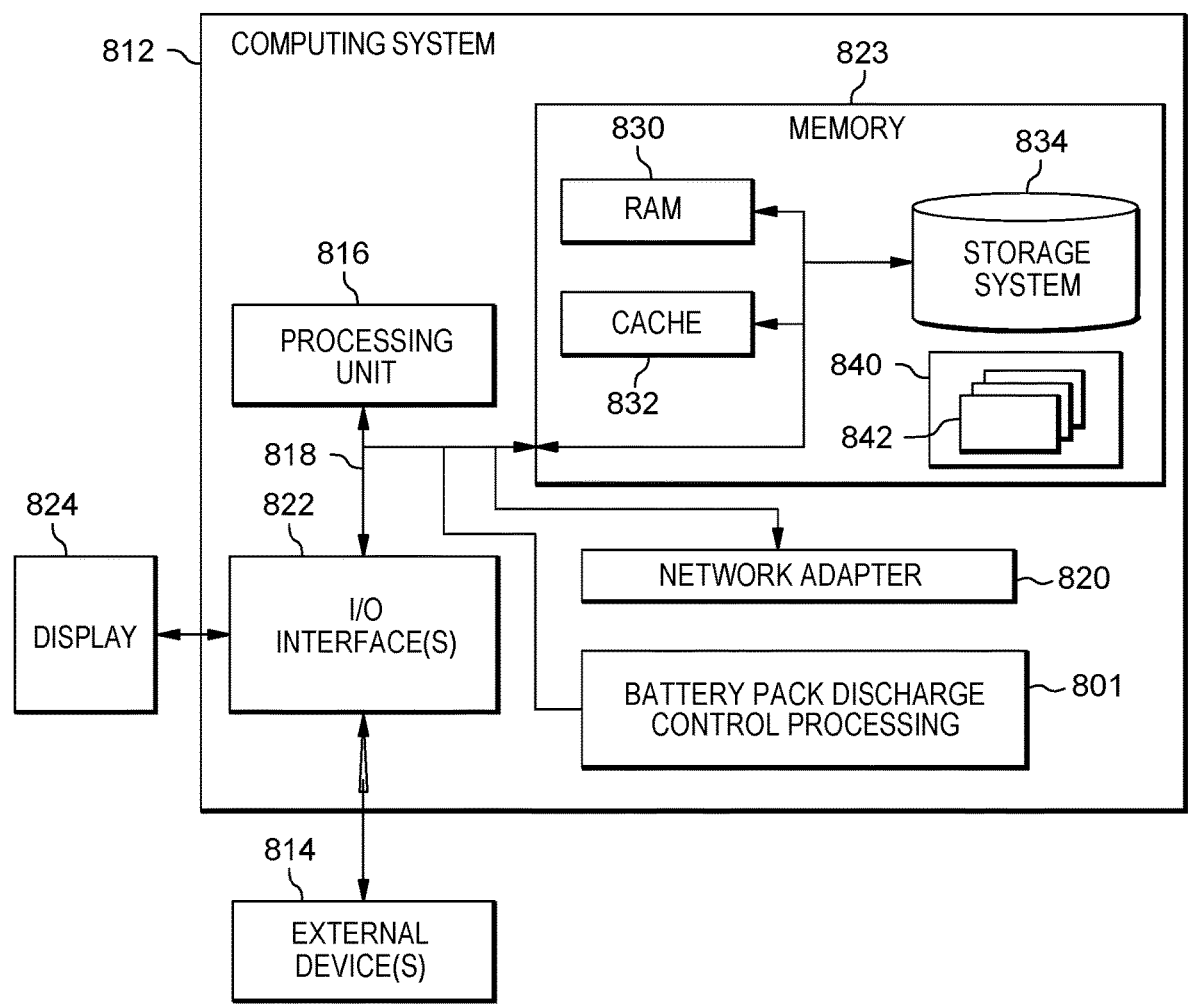
FIG. 8 depicts one embodiment of a computing system to implement, or facilitate implementing, one or more aspects of battery pack discharge control processing, in accordance with one or more aspects of the present invention.

In certain embodiments, the control processing can be implemented via program code. Program code, as referred to in this application, can include software and/or hardware. For example, program code in certain embodiments of the present invention can include fixed function hardware, but other embodiments can utilize a software-based implementation of the functionality described. Certain embodiments can combine both types of program code, for instance, as firmware. One example of program code, also referred to as one or more programs, is depicted in FIG. 8 as program/utility 840, having a set (at least one) of program modules 842, which can be stored in memory 823 and/or as a separate battery pack discharge control processing module 801 of a computing system 812. As noted, in one or more other implementations, the control processing can be implemented in one or more microcontrollers associated with, or provided as part of, the power supply system. For instance, in one implementation, a power supply circuit of the power supply system can have a microcontroller associated therewith, and a backup energy source of the power supply system can have another microcontroller associated therewith, with the microcontrollers being in operative communication with each other to facilitate performing one or more aspects of the discharge control processing disclosed herein.

In one or more embodiments, computing (or information technology (IT)) racks can include a variety of electronic components, as well as a power supply system to provide desired power levels to the electronic components within the computing rack. In one or more implementations, the power supply system can be an uninterruptible power supply (UPS), and can include one or more power supply circuits and one or more backup energy sources. The power supply circuit(s) receives main input power, such as AC utility power, and the backup energy source(s) is operatively coupled to the power supply circuit(s) to supply backup power to a system load when main input power to the power supply system is unavailable. In one particular implementation, the power supply circuit is a power regulation circuit, or power regulator, which is configured to supply one or more desired DC voltage levels to components within a system load, such as one or more electronic components within a computing rack or server system.

In one or more implementations, the backup energy source(s) includes one or more rechargeable battery packs. As noted, there are a wide variety of batteries available for use as energy sources, including as backup energy sources. Lithium-ion batteries currently have certain advantages over other rechargeable battery technologies, including, for instance, a higher power density, a lower weight, a lower self-discharge, and little or no "memory" effect. Lithium-ion batteries can be used in many backup energy applications, including for computing systems, such as computing racks, server systems, workstations, desktop computers, etc.

In certain embodiments, the backup energy source includes one or more rechargeable battery packs which provide standby power to the power supply circuit for powering the system load for at least a specified period of time upon loss of main input power. Depending on the implementation, a computing system can require a number of rechargeable battery packs as part of the backup energy source, with each pack including a potentially large number of battery cells. As noted, the backup energy source can include one or more circuits or components associated with the rechargeable battery packs to facilitate, when appropriate, charging or discharging of the battery packs to provide, for instance, backup power to the system load.

By way of example, FIG. 1 depicts one embodiment of a power supply system 100 to supply power to a power supply system load 130, such as one or more components of a computing system. In the embodiment illustrated, power supply system 100 includes one or more power supply circuits 110 which receive main input power 101 to facilitate powering system load 130. In one embodiment, main input power 101 can be, for instance, AC utility power received at power supply system 100.

As illustrated, power supply system 100 also includes an integrated backup energy source 120 with one or more battery packs 125 operatively coupled to power supply circuit(s) 110 to supply backup power to system load 130 when main input power 101 to power supply circuit 110 is interrupted. By way of specific example, system load 130 can be one or more components within a computing system, such as a computing rack requiring DC voltage, and power supply circuit(s) 110 can be, or include, one or more power regulators which, by way of example only, receive AC utility power, and rectify and regulate the power to provide a desired DC voltage to system load 130. Note that this is one example only.

Figure 2:
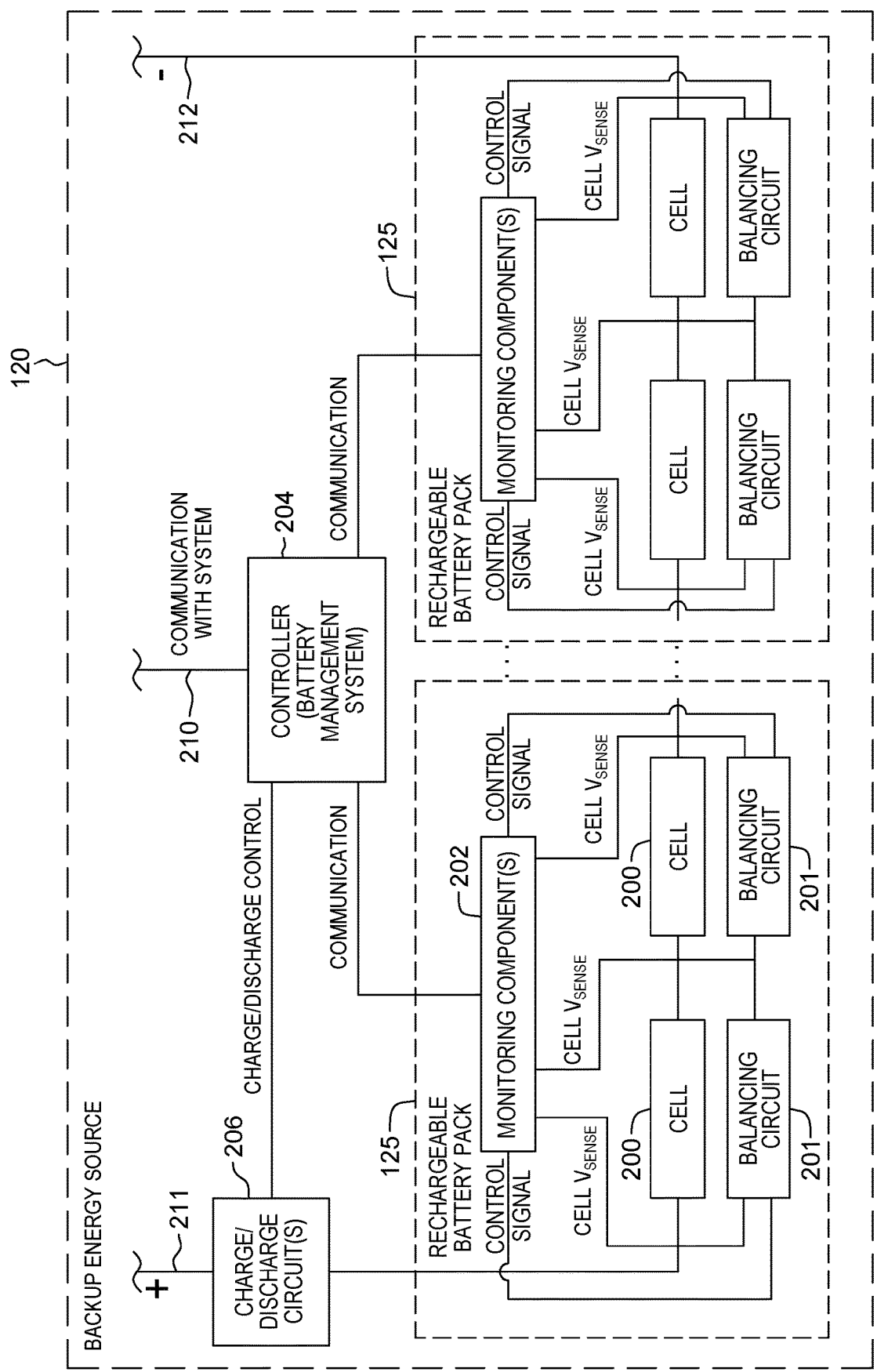
FIG. 2 depicts one embodiment of a backup energy source, with one or more rechargeable battery packs, for use within a power supply system such as depicted in FIG. 1, in accordance with one or more aspects of the present invention.

FIG. 2 depicts one embodiment of a backup energy source 120 which can be used, for instance, in a power supply system such as depicted in FIG. 1. As illustrated, backup energy source 120 can include multiple rechargeable battery packs 125.

In the embodiment of FIG. 2, rechargeable battery packs 125 include a plurality of battery cells 200, which can be grouped into one or more cell stacks. In one or more embodiments, cell voltage is monitored or sensed by monitoring components 202. The sensed cell voltages allow monitoring components 202, and thereby a controller 204, to know the state of charge (SoC) a cell is in, for instance, for shutting off or adjusting charging of the cell. Monitoring components 202 are provided to monitor voltage across the individual cells 200 in the battery packs, and balancing circuits 201, such as one or more respective transistors and resistors, allow each cell to balance with the other cells in the battery pack for network balancing purposes. In one embodiment, the battery cells are lithium-ion battery cells, the monitoring components 202 are multi-cell, lithium-ion battery managers, such as the multi-cell, lithium-ion battery managers available from various industry suppliers. Monitoring components 202 are operatively coupled to the controller (or battery management system) 204, which implements (in part) processing in accordance with one or more aspects disclosed herein. As shown, controller 202 is coupled to a charge/discharge circuit 206 for charge and discharge control, in accordance with one or more aspects of the present invention. Additionally, controller 204 is in communication with one or more power supply system components, such as a controller associated with the power supply circuit(s) of the power supply system, as described below in connection with the embodiment of FIG. 3.

Power input 211 and power output 212 lines are also provided, coupling backup energy source 120 to the power supply circuit(s), such as to a bus of the power supply circuit providing power to the system load, such as system load 130 in the embodiment of FIG. 1.

In one or more embodiments, a rechargeable battery pack is to be discharged where it is determined that the rechargeable battery pack requires servicing or replacement. For instance, if a battery pack requires servicing, the battery pack is to be discharged to a desired discharge threshold to allow safe storage and shipment of the battery pack. For instance, International Air Transport Association (IATA) requirements prevent lithium-ion cells from being shipped above 30% state of charge (SoC).

Similarly, when a battery pack reaches end-of-life (EoL), the battery pack generally will hold a set percentage charge of its original charge capacity. The battery pack that reaches end-of-life must still be discharged to a desired discharge level (e.g., 30% SoC) for safe storage and/or shipment.

In one or more implementations, controller 204 is configured to control discharge of a rechargeable battery pack across the associated balancing circuit(s) 201. As noted, the balancing circuit(s) 201 is configured to assist with measuring the operational values of the battery cells for network balancing. In one implementation, the controller 204 can issue one or more commands to selectively discharge one or more of battery cells 200 of a battery pack 125 across the respective balancing circuit(s) 201. Depending on the implementation, this discharge procedure can require a number of hours to accomplish, based, for instance, on the battery pack status and the initial charge level.

Disclosed herein are alternate embodiments for battery pack discharge which allow, for instance, a rechargeable battery pack to be discharged and made ready for removal and shipment within minutes, rather than hours, as the case with the above-noted battery discharge across the associated balancing circuits.

Embodiments of the present invention include a method, system and computer program product, where program code executing, for instance, within one or more controllers or control systems of a power supply system, determine occurrence of a condition within the power supply system. The power supply system includes a power supply circuit and a backup energy source, and the condition can be a service-required condition, a test-required condition, an end-of-life (EoL) condition, etc. The power supply circuit receives main input power, and the backup energy source is operatively coupled to the power supply circuit to supply backup power to a system load when main input power to the power supply circuit is unavailable. Based on determining occurrence of the condition within the power supply system, the controller (or control system) actively discharges a rechargeable battery pack of the backup energy source. The actively discharging includes controlling the power supply circuit to force discharging of power from the rechargeable battery pack to the system load by suspending the main input power within the power supply system from powering the system load.

In certain embodiments, the determined condition is related to the rechargeable battery pack, and the one or more controllers further monitor a state of charge of the rechargeable battery pack, and based on the state of charge dropping to a set discharge threshold, the controller(s) discontinues controlling the power supply circuit to force discharging of power from the rechargeable battery pack to the system load. In one embodiment, the determined condition is that the rechargeable battery pack requires servicing, for instance, has experienced a fault condition, is operating out of specification, is at end of life, etc. Further, the actively discharging by the controller can include blocking a charge circuit of the backup energy source from recharging the rechargeable battery pack being discharged.

In one or more implementations, the power supply circuit is, or includes, a power regulation circuit. The power regulation circuit includes a rectification and phase selection circuit, and a power factor correction circuit. In this implementation, suspending the main input power from powering the system load can include shutting down, at least in part, the rectification and phase selection circuit and/or the power factor correction circuit to suspend the main input power within the power supply system from powering the system load. In one embodiment, suspending the main input power from powering the system load can include blocking the main input power from powering an intermediate power bus of the power regulation circuit, with the suspending resulting in the discharging of power from the rechargeable battery pack to the intermediate bus.

In one or more embodiments, the determined condition is that the rechargeable battery pack is to undergo a state of health (SoH) test. In such a case, the controller further monitors a state of charge of the rechargeable battery pack, and based on the state of charge dropping to a set discharge threshold, discontinues controlling the power supply circuit to force discharging of power from the rechargeable battery pack to the system load.

In one or more further embodiments, the determined condition is an error condition related to one or more components of the power supply circuit. In such a case, the controller further temporarily shuts down the one or more components of the power supply circuit to clear the error condition from the power supply circuit, and discontinues controlling the power supply circuit to force discharging of the power from the rechargeable battery pack based on the clearing of the error condition from the power supply circuit.

In one or more implementations, the power supply system includes redundant power supply circuits, with each power supply circuit including redundant rechargeable battery packs. For instance, in one implementation, the power supply system can include two power supply circuits, with each power supply circuit being coupled to two or more respective rechargeable battery packs of a backup energy source. In such an implementation, the actively discharging can include determining an operating mode of the power supply system, and based on the operating mode being a reduced redundancy mode, the controller does not suspend the main input power within the power supply system from powering the system load, but rather controls the backup energy source to discharge power from the rechargeable battery pack through a balancing circuit associated with the rechargeable battery pack, and further discontinues discharging of the rechargeable battery pack through the balancing circuit associated with the rechargeable battery pack based on a state of charge of the rechargeable battery pack dropping to a set discharge threshold.

Figure 3:
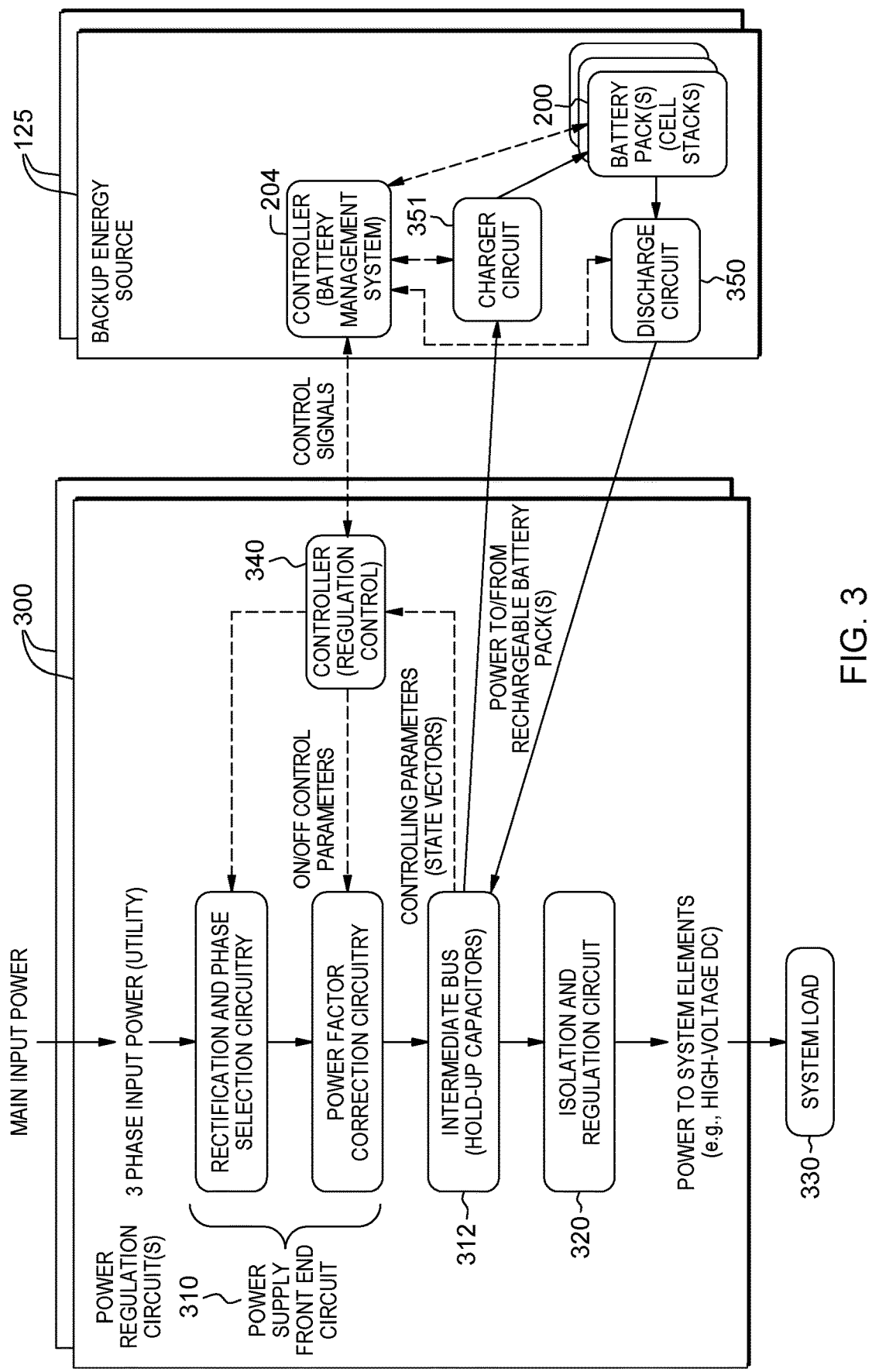
FIG. 3 depicts a further embodiment of a power supply system to incorporate selective discharging of a rechargeable battery pack across the power supply system load, in accordance with one or more aspects of the present invention.

FIG. 3 depicts one embodiment of a power supply system which includes redundant power supply circuits, implemented as power regulation circuits 300, and redundant backup energy sources 125, with each backup energy source including multiple rechargeable battery packs 200. In one embodiment, each power regulation circuit 300 has an associated backup energy source 125 for supplying backup power to a system load when main input power to the power supply circuit is unavailable.

As illustrated, each power regulation circuit 300 is connected to receive main power input, such as to an AC utility power line to receive, for instance, three-phase input power. In the illustrated embodiment, power regulation circuit 300 includes a power supply front end circuit 310, including, for instance, rectification and phase selection circuitry, as well as power factor correction circuitry. Further, in the embodiment illustrated, power supply front end circuit 310 provides power to an intermediate bus 312 with hold-up capacitors (in one embodiment). Intermediate bus 312 powers an isolation and regulation circuit 320 (or power supply back end circuit) which provides power to system elements of system load 330, for instance, as a high-voltage DC, depending on the system load requirements.

In the embodiment illustrated, a controller 340 (e.g., regulation control) is part of, or associated with, power regulation circuit 300. In part, controller 340 obtains controlling parameters and state vectors from intermediate bus 312 and provides, in one embodiment, ON/OFF control parameters to power supply front end circuit 310, including rectification and phase selection circuitry and power correction circuitry in the embodiment illustrated.

As illustrated in FIG. 3, power to/from the backup energy source(s) is provided by/to intermediate bus 312 of power regulation circuit 300. In the embodiment illustrated, backup energy source 125 includes one or more rechargeable battery packs 200, each with one or more respective cell stacks, as well as a battery pack controller 204, a discharge circuit 350 and a charge circuit 351. In operation, controller 340 of power regulation circuit 300 and controller 204 of the backup energy source 125 are in operative communication via exchange of appropriate control signals.

In normal operation, power flows from main input power, through power regulation circuit 300, to system load 330 via intermediate bus 312. When main input power is unavailable, such as interrupted, power is provided via one or more rechargeable battery packs 200 of backup energy source 125 to intermediate bus 312 to replace the charge lost. In typical operation, this replacement is automatic and results in self-discharging of the rechargeable battery pack(s). For instance, in one embodiment, with main input power provided, the intermediate bus voltage is at a first level, and upon the main input power becoming unavailable, intermediate bus 312 voltage begins to drop to a voltage level where the battery energy source 125 automatically begins providing power from the rechargeable battery pack(s) 200 to intermediate bus 312.

In one embodiment, power regulation circuit 300 of the power supply system embodiment of FIG. 3 is an example of a bulk power regulator (BPR) for a computing rack, wherein one or more DC voltage levels are provided to system elements within the rack. This is one example only of a power supply system which can utilize selective discharging of a backup rechargeable battery pack across a system load, such as disclosed herein.

Figure 4A:
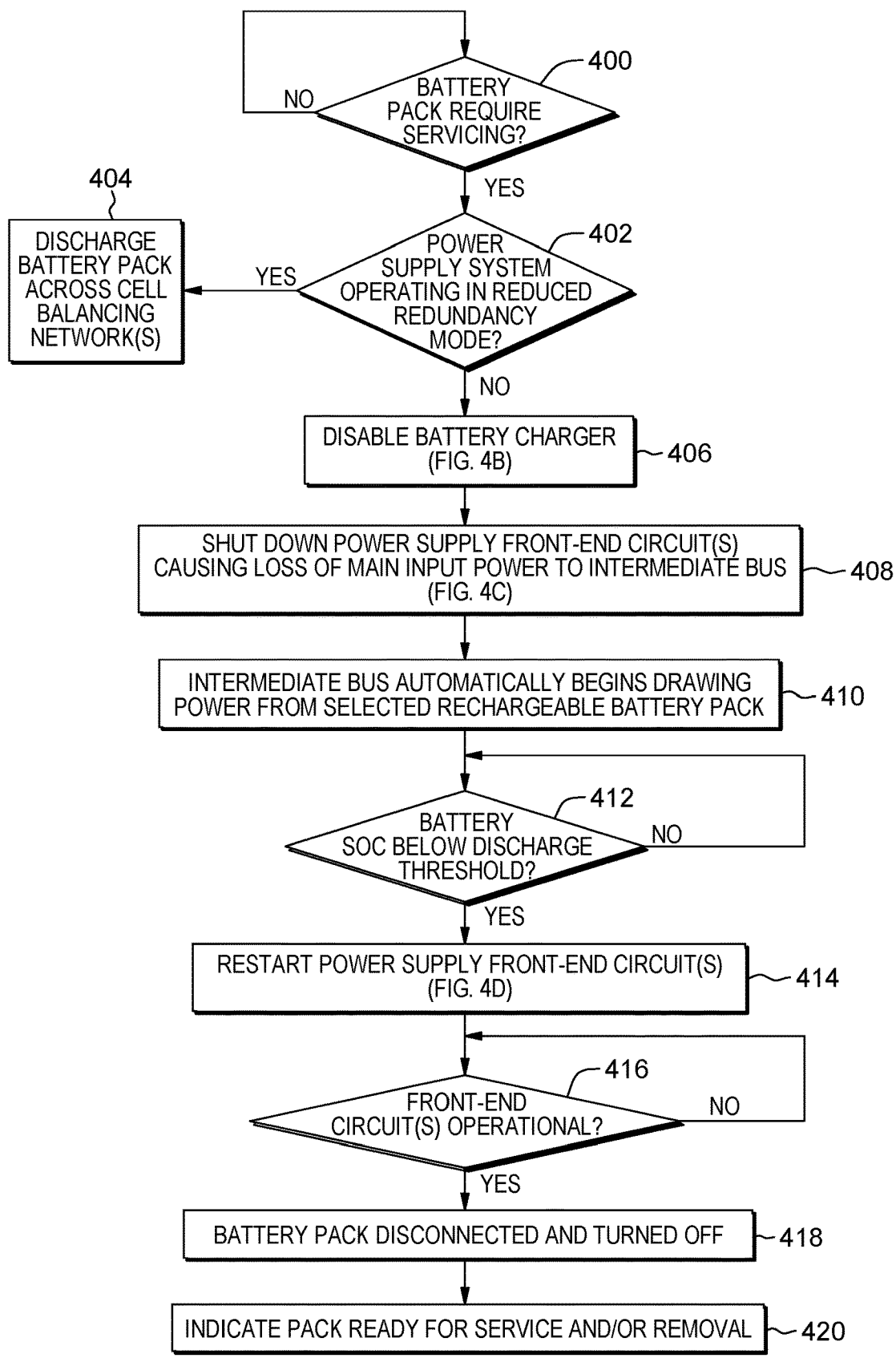
FIG. 4A depicts one embodiment of a control process for selective discharging of a rechargeable battery pack across the power supply system load, in accordance with one or more aspects of the present invention.

FIG. 4A depicts one embodiment of a control process for selective discharging of a rechargeable battery pack of a power supply system across a system load, in accordance with one or more aspects of the present invention. By way of example only, the control process is described herein with reference to the power supply system embodiment of FIG. 3, where one or more rechargeable battery packs (or cell stacks) are selectively discharged across the power regulation circuit by forcing the power regulation circuit to run off from the rechargeable battery pack(s), rather than main input power.

Referring to FIG. 4A, the control process initially determines whether there is an occurrence of a predefined condition within the power supply system, such as a battery pack requiring servicing 400. If "yes", then the controller determines whether the power supply system is currently operating in a reduced redundancy mode 402. As noted above, the power supply system implementation can include, for instance, redundant power supply circuits, such as redundant power regulation circuits, as well as redundant battery energy sources. Where the supply system is currently operating in a reduced redundancy mode, for instance, one of the power regulation circuits is offline, then the control process proceeds to discharge the battery pack across the pack's associated cell balancing circuit or network 404.

Figure 4B:
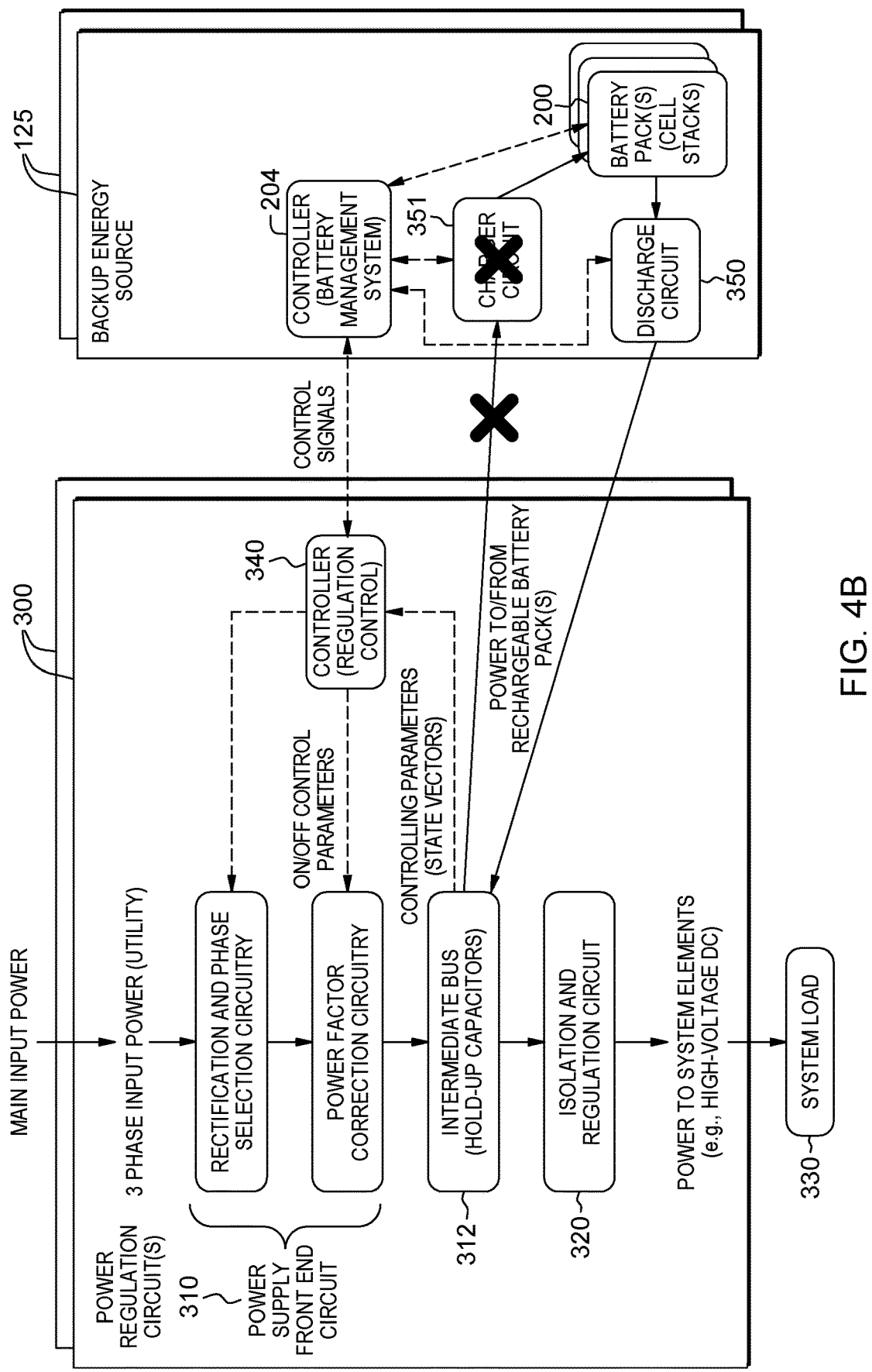
FIGS. 4B-4D depict certain aspects of the control process of FIG. 4A, shown within a power supply system such as depicted in FIG. 3, in accordance with one or more aspects of the present invention.

Assuming that the power supply system is not currently in reduced redundancy mode (i.e., is in normal operation mode), then the associated battery charger is shut off or otherwise disabled from charging the rechargeable battery pack at issue 406. An example of this is depicted in FIG. 4B in the context of the power supply system embodiment of FIG. 3. As illustrated, the charger circuit 351 is turned OFF, and/or the connection to the intermediate bus 312 opened via an appropriate switch or contact element provided in the line electrically connecting intermediate bus 312 and charger circuit 351. In one implementation, this disabling of the charge circuit can be performed by controller 204 of backup energy source 125.

Figure 4C:
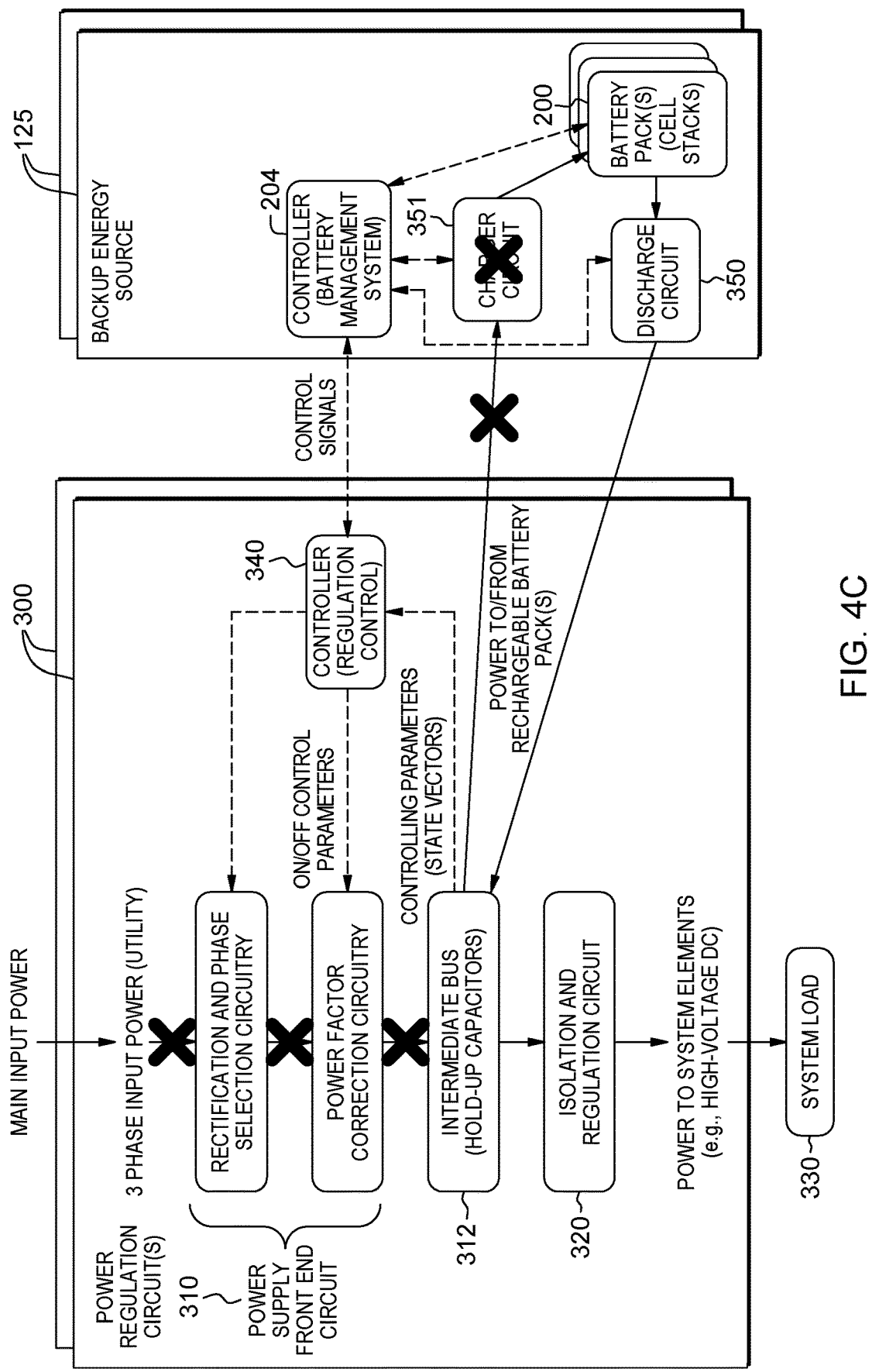

Continuing with the control process of FIG. 4A, the controller forces discharging of power from the rechargeable battery pack by suspending the main input power within the power supply system from powering the system load. For instance, in the embodiment of FIGS. 3-4D, controller 340 shuts down the power supply front end circuit 310, causing loss of main input power to intermediate bus 312, as illustrated in FIG. 4C. In one implementation, controller 340 utilizes the existing power supply front end circuits to turn off one or more aspects of the circuitry to prevent main input power from powering intermediate bus 312. Note that in one or more other implementations, a switch or other contact element can be provided in line with power supply front end circuit 310 to allow controller 340 to interrupt main input power from powering intermediate bus 312. Also, note that the controller (or control system) implementing one or more aspects disclosed herein can be controller 204 of backup energy source 125 and/or controller 340 of power regulating circuit 300. For instance, in one embodiment, certain control aspects described herein are distributed between controllers 204 and 340, which as noted, are in operative communication.

Figure 4D:
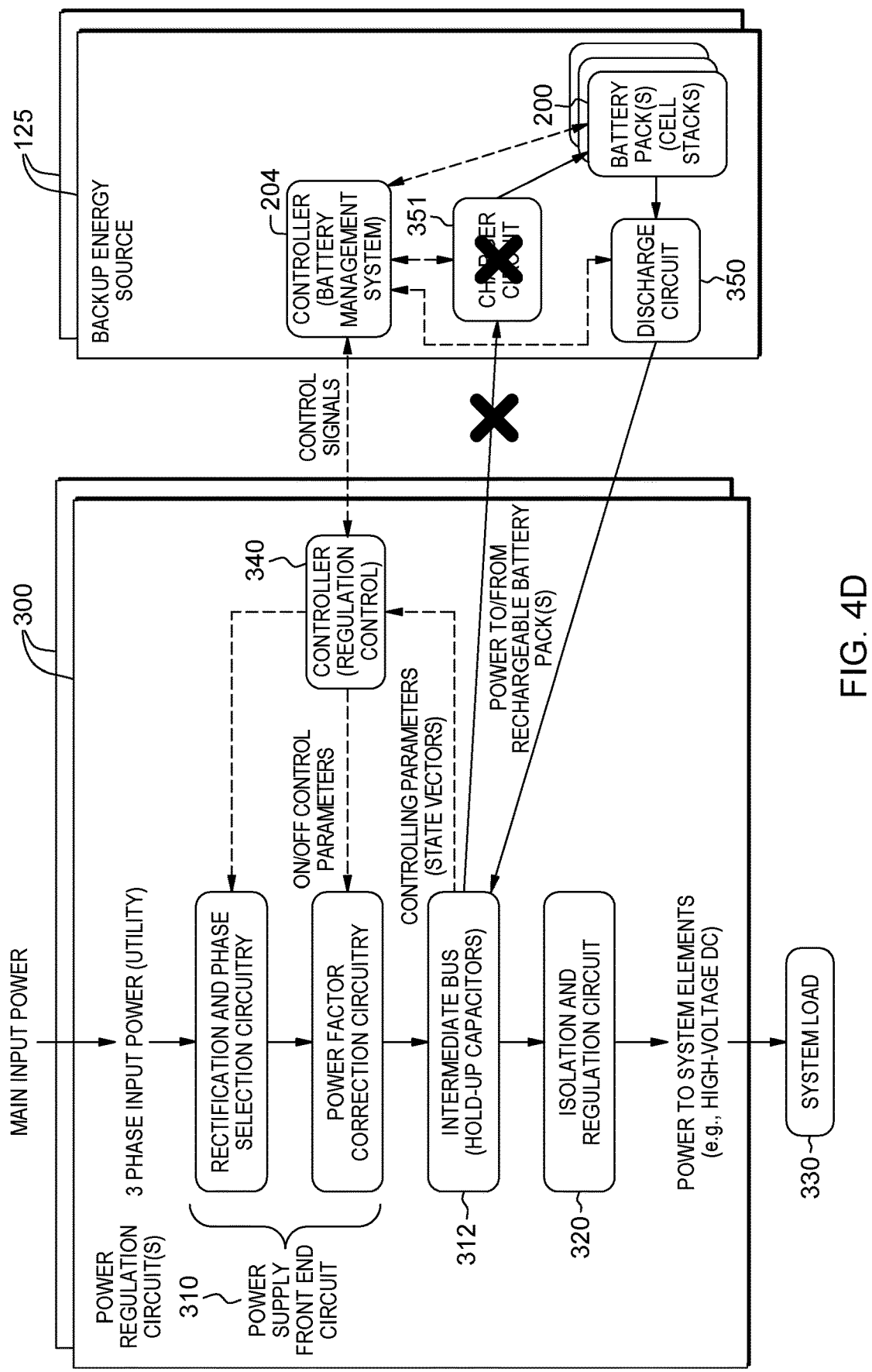

As illustrated in FIG. 4A, the intermediate bus automatically begins drawing power from the selected rechargeable battery pack 410 via discharge circuit 350 (see FIG. 4C). The control process monitors whether the state of charge of the rechargeable battery pack falls to or below a discharge threshold 412. For instance, in one embodiment, the controller monitors whether the state of charge of the battery pack has dropped below 30% of fully-charged. If so, then the power supply front end circuit is restarted, as illustrated in FIG. 4D. Note that in one embodiment, restarting of the front end circuitry occurs based on the battery pack charge dropping to, or below, 30% state of charge, and is before the battery voltage drops below a minimum state of charge for the power regulation circuit to operate, such as 20%. Thus, the desired battery pack discharge level for the power supply front end circuit to be restarted can be (in one embodiment) between 20%-30% state of charge. This allows time for the power supply front end circuit to be restarted and resume power regulation before the battery pack drops below the minimum state of charge for the power regulation circuit to operate.

As illustrated in FIG. 4A, in one embodiment, the controller disconnects the battery pack and turns the battery pack OFF 418. In one implementation, the controller provides an indication that the battery pack is ready for service and/or removal 420 once disconnected and turned OFF.

Those skilled in the art will note from the above description that a method, system and control process are provided herein for, for instance, controlling discharge of a rechargeable battery pack across the system load of a power supply system, such as a power regulation circuit, by forcing the power regulation circuit to run off of the integrated backup energy source, and more particularly, the rechargeable battery pack at issue, rather than main input power. In one embodiment, when the controller determines occurrence of a condition within the power supply system, such as a rechargeable battery pack requiring servicing or replacement, the controller signals the condition, and shuts down the front end of the power regulation circuit (in one embodiment), which cuts off main input power from the utility line from reaching the intermediate bus of the power regulation circuit. In this case, the power regulation circuit is forced to run off of the backup energy source power supplied to the intermediate bus, due to the loss of front end power. The power regulation circuit monitors the power discharge from the rechargeable battery pack, and restarts the front end circuitry of the power regulation circuit when the rechargeable battery pack has discharged below a set discharge level, such as below 30% state of charge (SoC), but before battery voltage drops below a minimum state of charge for the power regulation circuit to operate, such as 20%. When the front end circuitry is restarted, main input power once again flows to the intermediate bus, and powers the system. As part of the control process, the backup energy source is electrically cut off from the power regulation circuit so that it does not recharge automatically. If the system is operating in reduced redundancy mode, for instance, one power regulation circuit side is down, redundancy is reduced. In this case, the control process will not allow the power supply front end circuit to be shut down, but rather, reverts to discharging the rechargeable battery pack across the associated balancing network. This advantageously protects the system against a power failure. The controller can log the battery pack serial number, initial SoC, final SoC, error code, and other relevant information for failure analysis for system improvement, if desired.

Figure 5:
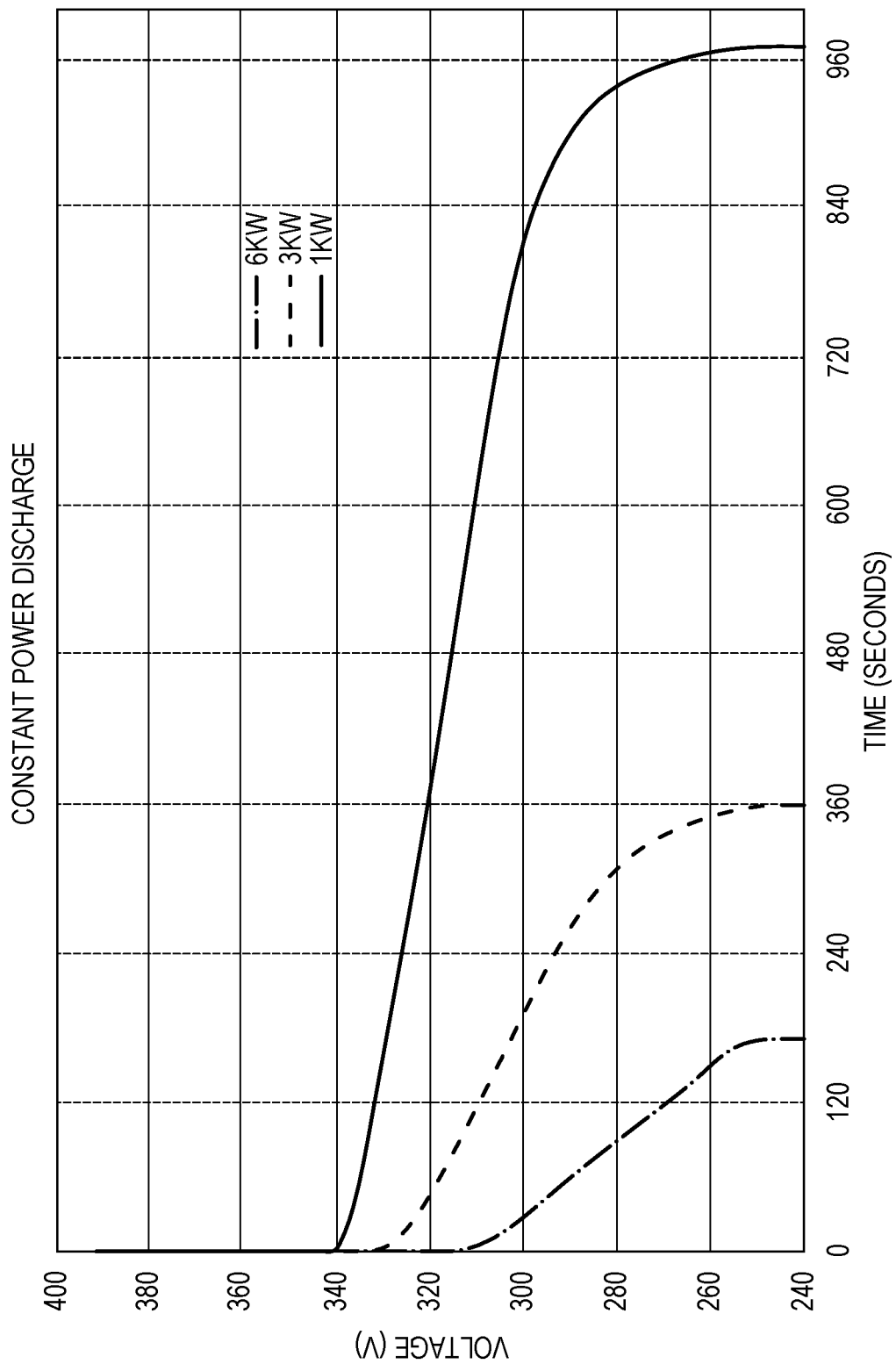
FIG. 5 is a graphical representation of time of discharge of a rechargeable battery pack for different system power loads, in accordance with one or more aspects of the present invention.

FIG. 5 depicts one embodiment of time required for consistent discharge for a fully-charged 340 volt battery across different power system loads, with 1 KW, 3 KW and 6 KW being illustrated by way of example only. As shown, in the case of a 6 KW load, the rechargeable battery pack discharges in approximately 3 minutes, while for the 3 KW system load, the pack discharges in approximately 6 minutes, and for the 1 KW system load, the pack discharges in approximately 15 minutes, all of which are discharge times significantly better than achievable with discharge of power across the balancing network only.

Figure 6:
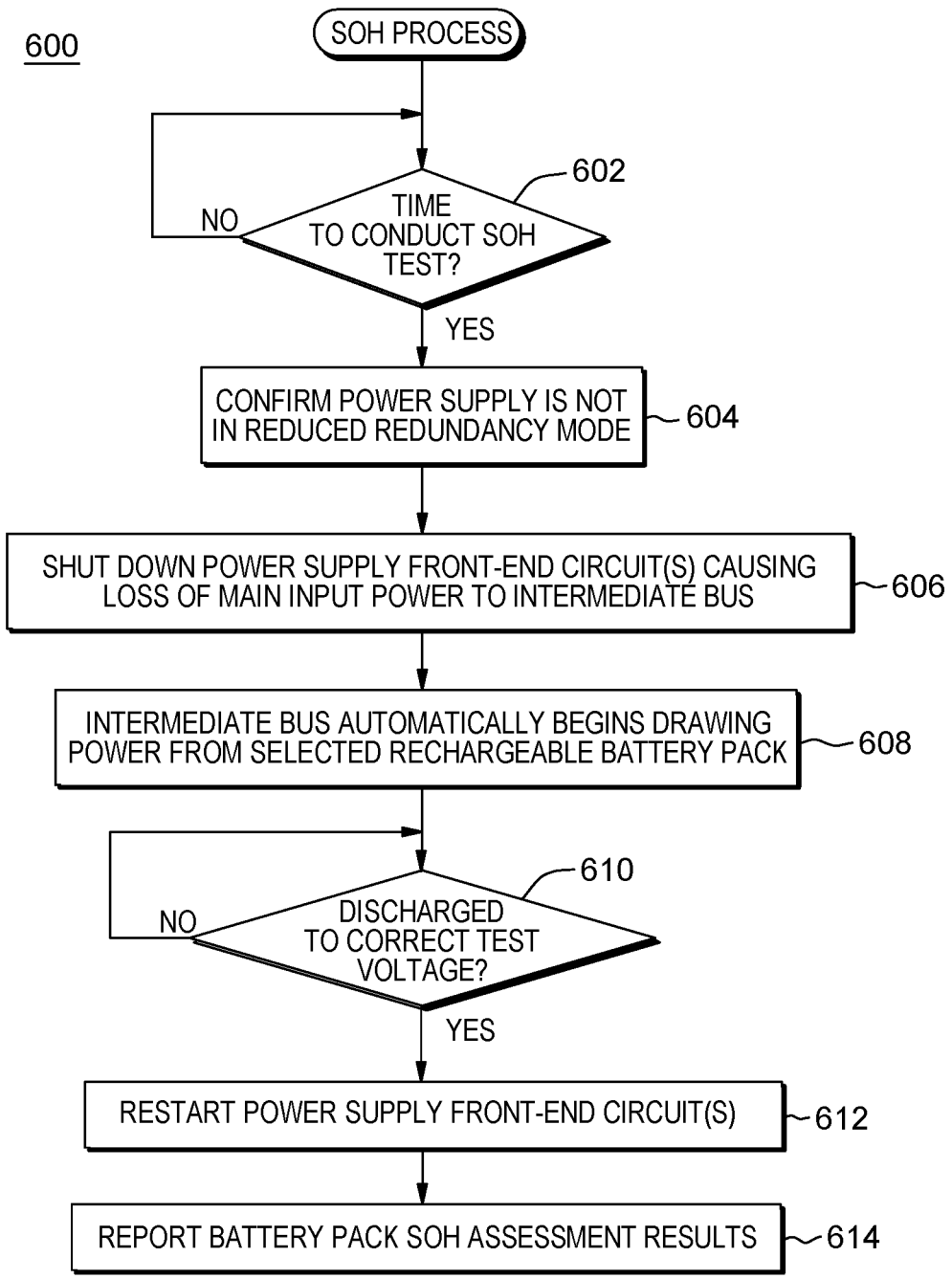
FIG. 6 depicts one embodiment of another control process for selective discharging of a rechargeable battery pack across the power supply system load for assessing the state of health of the rechargeable battery pack, in accordance with one or more aspects of the present invention.

FIG. 6 depicts one embodiment of another control process 600 for selective discharging of a rechargeable battery pack across the power supply system load, such as disclosed herein. Control process 600 is one embodiment of a state of health (SoH) process for testing a battery pack to assess the battery pack state of health. To assess a battery pack state of health, the battery pack needs to be discharged in order to facilitate determining the remaining life and useful capacity of the pack's cell stack. The SoH test is another condition which the controller can be configured (or programmed) to recognize and/or perform.

Referring to FIG. 6, control processing initially determines whether it is time to conduct a state of health (SoH) test 602. If "no", then processing waits until it is time to conduct the test. If it is time to conduct the SoH test, then control processing confirms that the power supply system is not in a reduced redundancy mode 604. If the power supply system is in reduced redundancy mode, then the control process waits for the power supply system to return to normal operating mode before proceeding with a SoH test. Once confirming that the power supply system is not in reduced redundancy mode, the control process shuts down the power supply front end circuit(s), causing loss of main input power to the intermediate bus 606. Based on this action, the intermediate bus automatically begins drawing power from at least the selected rechargeable battery pack to be discharged 608. Control processing determines whether the rechargeable battery pack has been discharged to the correct test voltage 610, and if so, restarts the power supply front end circuit(s) 612. Further, the control process can report the battery's state of health (SoH) assessment results 614 to, for instance, a testing facility monitoring the battery pack backups.

Figure 7:
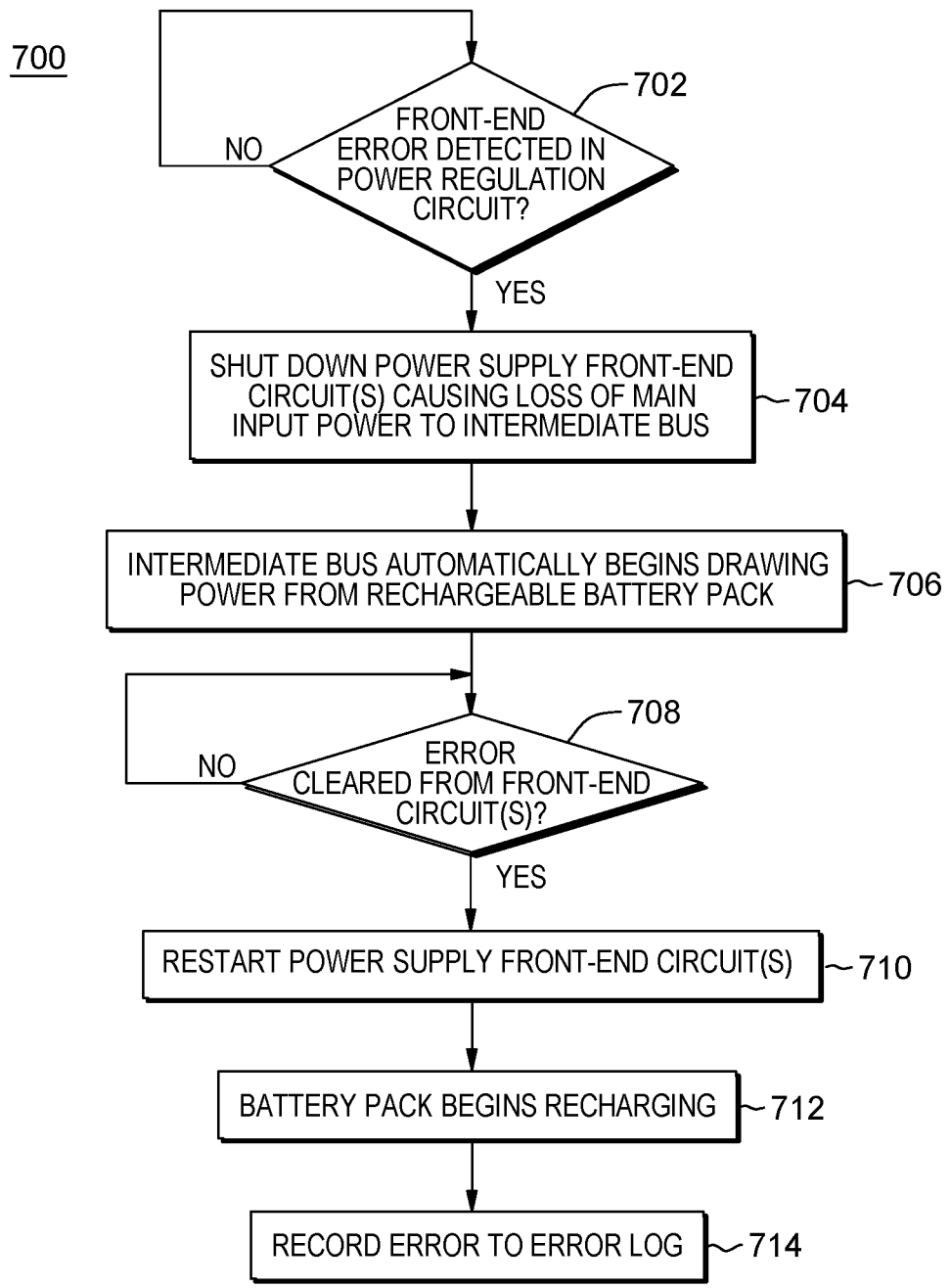
FIG. 7 depicts a further embodiment of a control process for selective discharging of a rechargeable battery pack across the power supply system load to facilitate correcting an error associated with the power supply front end circuitry, in accordance with one or more aspects of the present invention.

FIG. 7 depicts another embodiment of a control process 700 for selective discharging of a rechargeable battery pack across the power supply system load, in accordance with one or more aspects disclosed herein. This control process can be used to resolve glitches and other soft errors on the power supply front end, such as the front end circuitry of a power regulation circuit described herein, without necessarily requiring a manual repair action.

In the embodiment illustrated, control process 700 determines that a front end error condition is detected in the power regulation circuit 702, and based on determining occurrence of this condition, shuts down the power supply front end circuit(s), causing loss of main input power within the power supply system to the intermediate bus of the system 704. Based on this action, the intermediate bus automatically begins drawing power from at least the selected rechargeable battery pack 706. Control processing determines whether the error has been cleared from the front end circuit(s) 708, and if so, restarts the power supply front end circuit(s) 710. The battery pack is allowed to begin recharging 712, and the noted error condition can be recorded to an error log 714.

Those skilled in the art will note from the above description that provided herein are a method, system and program product which allow, in one or more implementations, for rapid discharge of a battery pack requiring servicing. In one implementation, the battery pack can be associated with a computing system, such as a computing rack or a server system, and the discharging can include (in one embodiment) selectively disabling the front end of the power supply circuit, such as the front end of a power regulation circuit, to force discharge of the battery pack at issue.

In one or more implementations, the control process stops discharge of the battery pack when the state of charge reaches a set discharge threshold, such as 30%, which is a level that is above a minimum voltage threshold required for the power supply front end circuitry to be restarted, thereby allowing restoring of main input power. Further, in certain embodiments, the control process automatically interrupts the electrical connection between the rechargeable battery pack and the power supply circuit to prevent charging of the battery pack after discharge.

Further exemplary embodiments of a computing environment to implement one or more aspects of the present invention are described below with reference to FIGS. 8-10.

By way of further example, FIG. 8 depicts one embodiment of a computing environment 800, which includes a computing system 812. Examples of well-known computing systems, environments, and/or configurations that may be suitable for use with computer system 812 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 812 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 8, computing system 812, is shown in the form of a general-purpose computing device. The components of computing system 812 can include, but are not limited to, one or more processors or processing units 816, a system memory 823, and a bus 818 that couples various system components including system memory 823 to processor 816.

In one embodiment, processor 816 may be based on the z/Architecture® offered by International Business Machines Corporation, or other architectures offered by International Business Machines Corporation or other companies.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 can include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 can further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 can include at least one program product having a set (e.g., at least one) of program modules or code that are configured to carry out the functions of embodiments of the invention.

Program/utility 840, having a set (at least one) of program modules 842, can be stored in memory 832 by way of example, and not limitation, as well as an operating system, one or more application programs, other program modules, and program data. Each of the operating system, one or more application programs, other program modules, and program data or some combination thereof, can include an implementation of a networking environment. Program modules 842 generally carry out the functions and/or methodologies of embodiments of the invention as described herein. Alternatively, a battery pack discharge control facility, module, logic, etc., 801 can be provided within computing environment 812, as disclosed herein.

Computing system 812 can also communicate with one or more external devices 814 such as a keyboard, a pointing device, a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 8. Computer system/server 812 of FIG. 8 can be practiced in distributed cloud computing environments where tasks are performed by remote processing devices that are linked through a communications network. In a distributed cloud computing environment, program modules may be located in both local and remote computer system storage media including memory storage devices. Computer system/server 812 is capable of being implemented and/or performing any of the functionality set forth hereinabove.

Figure 9:
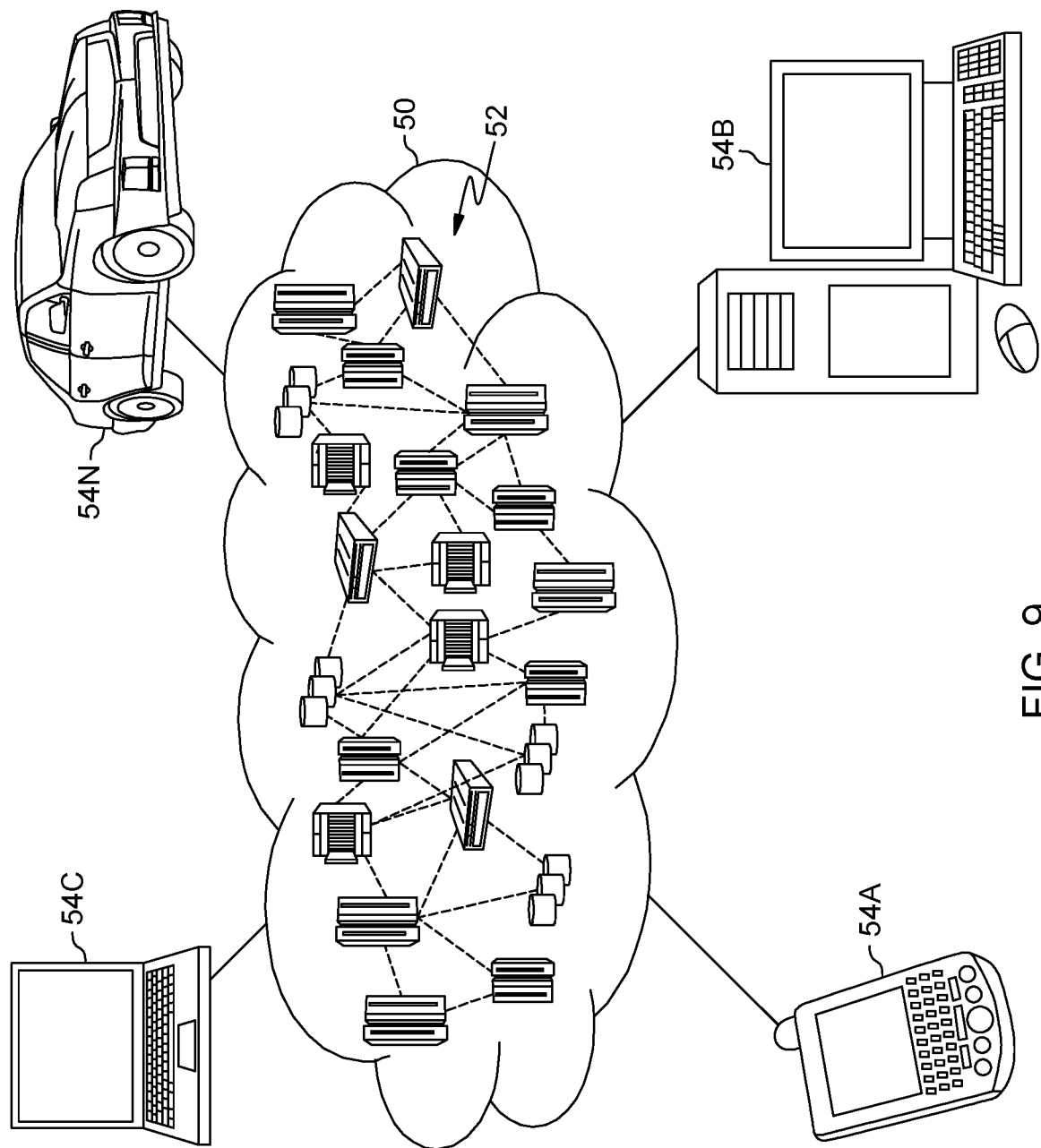
FIG. 9 depicts one embodiment of a cloud computing environment which can facilitate implementing, or be used in association with, certain aspects of an embodiment of the present invention.

Referring now to FIG. 9, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 10:
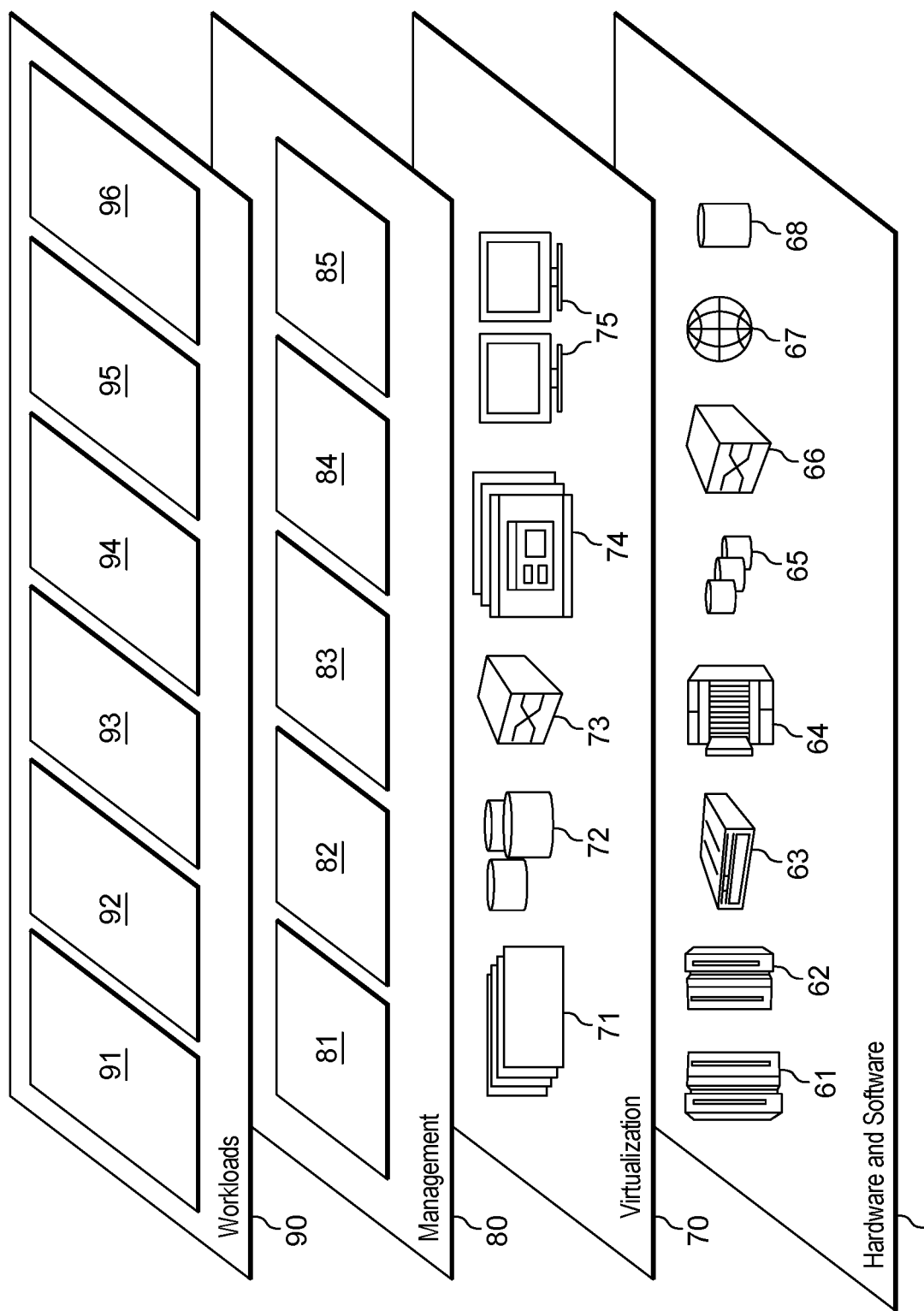
FIG. 10 depicts abstraction model layers according to an embodiment of the present invention.

Referring to FIG. 10, a set of functional abstraction layers provided by cloud computing environment 50 (FIG. 9) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and battery pack discharge control processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   determining occurrence of a condition within a power supply system powering a system load, the power supply system including a power regulation circuit and a backup energy source, the power regulation circuit receiving main input power to power the system load and the backup energy source being operatively coupled to the power regulation circuit to supply backup power to the system load based on main input power to the power regulation circuit being unavailable to power the system load; and
   based on determining occurrence of the condition within the power supply system, actively discharging, by a controller, a rechargeable battery pack of the backup energy source, the actively discharging comprising:
   controlling the power regulation circuit to:
      suspend the main input power within the power supply system from powering the system load; and
      force discharge of power from the rechargeable battery pack to the system load.

2. The method of claim 1, wherein the determined condition is related to the rechargeable battery pack, and the method further comprises monitoring a state of charge of the rechargeable battery pack, and based on the state of charge dropping to a set discharge threshold, discontinuing controlling the power regulation circuit to force discharging of power from the rechargeable battery pack to the system load.

3. The method of claim 2, wherein the determined condition is that the rechargeable battery pack requires servicing.

4. The method of claim 2, wherein the actively discharging further comprises blocking a charge circuit of the backup energy source from recharging the rechargeable battery pack.

5. The method of claim 1, wherein the power regulation circuit comprises a rectification and phase selection circuit and a power factor correction circuit, and wherein suspending the main input power from powering the system load comprises shutting down, at least in part, the rectification and phase selection circuit or the power factor correction circuit to suspend the main input power within the power supply system from powering the system load.

6. The method of claim 5, wherein suspending the main input power from powering the system load comprises blocking the main input power from powering an intermediate power bus of the power regulation circuit, the suspending resulting in the discharging of the power from the rechargeable battery pack to the intermediate power bus.

7. The method of claim 1, wherein the determined condition is that the rechargeable battery pack is to undergo a state of health (SoH) test.

8. The method of claim 7, further comprising monitoring a state of charge of the rechargeable battery pack, and based on the state of charge dropping to a set discharge threshold, discontinuing controlling the power regulation circuit to force discharging of power from the rechargeable battery pack to the system load.

9. The method of claim 1, wherein the determined condition is an error condition related to one or more components of the power regulation circuit.

10. The method of claim 9, further comprising temporarily shutting down the one or more components of the power regulation circuit to clear the error condition from the power regulation circuit, and discontinuing controlling the power regulation circuit to force discharging of power from the rechargeable battery pack based on clearing of the error condition from the power regulation circuit.

11. The method of claim 1, wherein the power supply system comprises redundant power regulation circuits, each with associated redundant rechargeable battery packs, and wherein the actively discharging further comprises:
   determining an operating mode of the power supply system, and based on the operating mode being a reduced redundancy mode:
      avoiding suspending the main input power within the power supply system from powering the system load;
      controlling the backup energy source to discharge power from the rechargeable battery pack through a balancing circuit associated with the rechargeable battery pack; and
      discontinuing discharging of the rechargeable battery pack through the balancing circuit associated with the rechargeable battery pack based on a state of charge of the rechargeable battery pack dropping to a set discharge threshold.

12. A power supply system comprising:
   a power regulation circuit, the power regulation circuit receiving main input power, and the power regulation circuit powering a system load using the main input power;
   a backup energy source, the backup energy source including a rechargeable battery pack, and the backup energy source being operatively coupled to the power regulation circuit to supply backup power to the system load when main input power to the power supply system load is unavailable; and
   a controller, the controller being operatively coupled to:
      suspend the main input power within the power supply system from powering the system load; and
      force discharge of power from the rechargeable battery pack to the system load.

13. The power supply system of claim 12, wherein the determined condition is that the rechargeable battery requires servicing, and wherein the controller further blocks a charge circuit of the backup energy source from recharging the rechargeable battery pack, and monitors a state of charge of the rechargeable battery pack, and based on the state of charge dropping to a set discharge threshold, discontinues controlling the power regulation circuit to force discharging of power from the rechargeable battery pack to the system load.

14. The power supply system of claim 12, wherein the power regulation circuit comprises a rectification and phase selection circuit and a power factor correction circuit, and wherein suspending the main input power from powering the system load comprises shutting down, at least in part, the rectification and phase selection circuit or the power factor correction circuit to suspend the main input power within the power supply system from powering the system load.

15. The power supply system of claim 12, wherein the determined condition is that the rechargeable battery pack is to undergo a state of health (SoH) test, and wherein the controller monitors a state of charge of the rechargeable battery pack, and based on the state of charge dropping to a set discharge threshold, discontinues controlling the power regulation circuit to force discharging of power from the rechargeable battery pack to the power supply system load.

16. The power supply system of claim 12, wherein the determined condition is an error condition related to one or more components of the power regulation circuit, and wherein the controller temporarily shuts down the one or more components of the power regulation circuit to clear the error condition from the power regulation circuit, and based on clearing the error condition for the power regulation circuit, discontinues controlling the power regulation circuit to force discharging of power from the rechargeable battery pack to the system load.

17. A computer program product comprising:
 at least one computer-readable storage medium having computer-readable code embodied therein, the computer-readable code being executable by one or more processors to cause the one or more processors to:
  determine occurrence of a condition within a power supply system powering a system load, the power supply system including a power regulation circuit and a backup energy source, the power regulation circuit receiving main input power to power the system load and the backup energy source being operatively coupled to the power regulation circuit to supply backup power to the system load based on when main input power to the power regulation circuit being unavailable to power the system load; and
  based on determining occurrence of the condition within the power supply system, actively discharge a rechargeable battery pack of the backup energy source, the actively discharging comprising:
   controlling the power regulation circuit to:
    suspend the main input power within the power supply system from powering the system load; and
    force discharge of power from the rechargeable battery pack to the system load.

18. The computer program product of claim 17, wherein the determined condition is that the rechargeable battery pack requires servicing, and wherein the computer-readable code is executable by the one or more processors to further cause the one or more processors to block a charge circuit of the backup energy source from recharging the rechargeable battery pack, and to monitor a state of charge of the rechargeable battery pack, and based on the state of charge dropping to a set discharge threshold, discontinue controlling the power supply circuit to force discharging of power from the rechargeable battery pack to the system load.

19. The computer program product of claim 17, wherein the power regulation circuit comprises a rectification and phase selection circuit and a power factor correction circuit, and wherein the computer-readable program code is executable by the one or more processors to cause the one or more processors to suspend the main input power from powering the system load by shutting down, at least in part, the rectification and phase selection circuit or the power factor correction circuit to suspend the main input power within the power supply system from powering the system load.

20. The computer program product of claim 17, wherein the determined condition is that the rechargeable battery pack is to undergo a state of health (SoH) test, and wherein the computer-readable program code is executable by the one or more processors to cause the one or more processors to monitor a state of charge of the rechargeable battery pack, and based on the state of charge dropping to a set discharge threshold, discontinue controlling the power regulation circuit to force discharging of power from the rechargeable battery pack to the system load.

* * * * *